(12) United States Patent
Kurtz et al.

(10) Patent No.: US 7,997,143 B2
(45) Date of Patent: Aug. 16, 2011

(54) INTERNALLY SWITCHED MULTIPLE RANGE TRANSDUCER

(75) Inventors: Anthony D. Kurtz, Saddle River, NJ (US); Louis DeRosa, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 126 days.

(21) Appl. No.: 12/384,821

(22) Filed: Apr. 9, 2009

(65) Prior Publication Data

US 2010/0257936 A1    Oct. 14, 2010

(51) Int. Cl.
    *G01L 13/02* (2006.01)
(52) U.S. Cl. ............................. 73/716; 73/736
(58) Field of Classification Search .................. None
    See application file for complete search history.

(56) References Cited

U.S. PATENT DOCUMENTS

| | | | |
|---|---|---|---|
| 4,160,600 A * | 7/1979 | Luke | 356/506 |
| 4,192,005 A | 3/1980 | Kurtz | |
| 4,212,191 A * | 7/1980 | Ethridge | 73/861.47 |
| 4,445,383 A | 5/1984 | Binder et al. | |
| 4,528,855 A | 7/1985 | Singh | |
| 6,401,541 B1 | 6/2002 | Kurtz | |
| 6,545,610 B2 | 4/2003 | Kurtz | |
| 6,642,594 B2 | 11/2003 | Kurtz | |
| 6,861,276 B2 | 3/2005 | Kurtz | |
| 2003/0107095 A1 | 6/2003 | Kurtz | |
| 2010/0028618 A1 * | 2/2010 | Gonska et al. | 428/188 |

FOREIGN PATENT DOCUMENTS

WO    2006113759    10/2006

OTHER PUBLICATIONS

International Search Report and Written Opinion dated Sep. 20, 2010 for related PCT Application No. PCT/US2010/030547.

* cited by examiner

*Primary Examiner* — Andre J Allen
(74) *Attorney, Agent, or Firm* — James E. Schutz, Esq.; Jihan A. R. Jenkins, Esq.; Troutman Sanders LLP

(57) ABSTRACT

There is disclosed an internally switched multiple range transducer. The transducer employs a plurality of individual pressure sensors or Wheatstone bridges fabricated from semiconductor materials and utilizing piezoresistors. Each sensor is designed to accommodate accurately a given pressure range, therefore, each sensor is selected to provide an output when an applied pressure is within its accommodated range. As soon as the pressure exceeds the range, then another sensor is employed to produce an output. Each of the sensors, or each separate transducer, is coupled to a switch or other device to enable the selection of one of the plurality of sensors to operate within its given pressure range when the applied pressure is in that range. In this manner one obtains pressure measurements with a high degree of accuracy across a relatively large pressure range.

16 Claims, 3 Drawing Sheets

INTERNALLY SWITCHED MULTIPLE RANGE TRANSDUCER

FIELD OF THE INVENTION

This invention relates to pressure transducers and more particularly to an array of multiple pressure transducers wherein a selected one is switched into operation according to the pressure range being monitored.

BACKGROUND OF THE INVENTION

As one can ascertain it is often necessary to measure pressure with a high degree of accuracy and across a relatively large pressure range. Typical accuracy is specified as a percent of full scale. Therefore, even when a pressure transducer is manufactured with an extreme accuracy tolerance it may prove to be relatively inaccurate at the lower portion of the pressure range. Also it is often of interest to resolve accurately a relatively small differential pressure coupled to a fairly high line pressure. In both cases it is desirable that multiple sensing elements or multiple transducers, each of which is optimized for a specific portion of the pressure range, be employed. In the prior art, multiple pressures are measured employing multiple pressure transducers. For example, see U.S. Pat. No. 6,401,541 entitled "Multiple Pressure Sensing System" issued on Jun. 11, 2002 to Anthony D. Kurtz, an inventor herein, and assigned to Kulite Semiconductor Products, Inc. In that patent there is shown a plurality of pressure transducers where each can measure a different pressure range and are coupled to a single remote processor. In that particular patent it is a desire to measure multiple pressures by using multiple pressure transducers, but which transducers are exposed to different environments and where the pressure from each transducer is measured during a different interval. In any event, as one can ascertain from the above noted patent, there is shown multiple pressure transducers, switching devices and a microcontroller which controls the switching devices, and selects given sequences to access said transducers. The above noted patent is hereby incorporated in its entirety.

The present invention uses multiple sensing elements and an appropriate switching device to condition the signal, the internal functionality of the transducer would provide a continuous output proportional to the applied pressure over a large pressure range but with significantly enhanced accuracy. It is also understood that the assignee, Kulite, has many patents regarding the design and operation of pressure transducers in all types of environments and in all types of ranges. The present invention thus employs multiple pressure transducers which are selectively switched into operation or selectively utilized according to a different pressure range. Thus according to the present invention, one would employ multiple sensing elements each of which is optimized for a specific portion of the pressure range and each of which is selected according to that portion of the pressure range being measured.

SUMMARY OF THE INVENTION

A plurality of pressure sensors, each responsive to an associated pressure range, wherein each sensor can accommodate a different pressure range to enable accurate pressure measurements over a wide range equal to the sum of said different ranges, means coupled to said plurality of pressure sensors and operative to select any one of said sensors according to the magnitude of an applied pressure, said selected sensor determined by whether said applied pressure is within the desired operating range of said sensor.

DETAILED DESCRIPTION OF THE FIGURES

Figure 1:
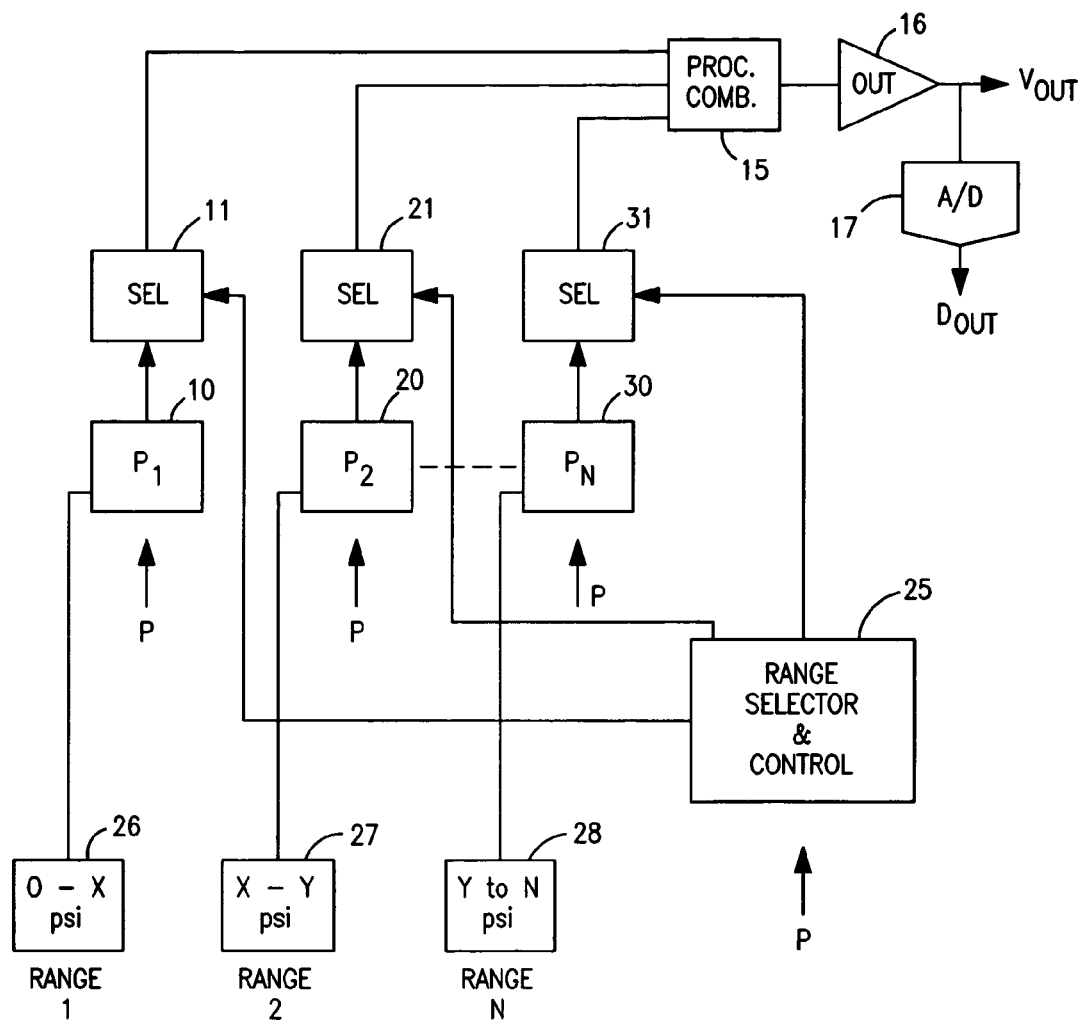
FIG. 1 is a block diagram of an internally switched multiple range transducer, according to this invention

Referring to FIG. 1, there is shown a block diagram of a switched multiple range transducer according to this invention. As ascertained above pressure transducers are designed to operate over various pressure ranges. As also indicated, it would be desirable to measure pressure with a high degree of accuracy, across a relatively large pressure range. Thus when a transducer is manufactured with an extreme accuracy tolerance it may prove relatively inaccurate at the lower portion of the pressure range. In FIG. 1, there are depicted pressure sensors or transducers 10, 20 and 30. While the number of pressure transducers shown is three, it is indicated that the system can accommodate more. In any event, a pressure range is specified between 0 psi through N psi. As seen, the first pressure transducer designated $P_1$ 10 operates over a range of 0 to X psi. This is a low pressure range and, for example, may be a range of 0 to 15 psi, while the second pressure transducer is designed to be accurate over a range of X to Y psi, where X is 15 psi and Y may be, for example, 100 psi or greater. The third pressure transducer, 30, will operate over a range from Y psi to N psi, which for example may be 200 or 300 psi and so on. In order to explain the invention it is shown that the total pressure range is therefore broken up into 3 ranges, whereby pressure transducer 10 operates to accommodate range 1, as indicated by module 26, pressure transducer 20 is designed to operate over the range of X to Y or range 2, as designated by module 27, while pressure transducer 30 is designated to operate over the range of Y to N as designated by module 28. Module 25, designated as a range selector and control module also receives a pressure, and for example, may be a single pressure transducer which produces a voltage output across the entire range. The voltage output from the coarse pressure transducer in range selector 25, determines the range for the applied P. In this manner, the range selector determining the range selects a module as 11, 21 and 31. One of the transducers 10, 20 or 30 operates in that range as determined by module 25. Therefore, if the value of pressure is greater than X than the range selector and controller 25 would select pressure transducer 20 and pressure transducer 20 would be switched via selector 21 to the processing combiner 15 and hence to the output amplifier 16 where a voltage would be provided at the output, indicative of the voltage output of pressure transducer 20. It is also seen, that one can have an analog output voltage via module 16, or one can take the output of amplifier 16 and convert it to a digital signal via the analog to digital converter 17 to produce a digital output. As one can ascertain from FIG. 1, the range selector and control device 25 determines what range the pressure P is in, and then selects a suitable sensor or transducer 10, 20 or 30 for operation in this range. The pressure sensor, for example, that can be selected as pressure sensor 10 via selector 11, pressure sensor 20 via selector 21 or pressure sensor 30 via selector 31. The selectors can be switches or other devices. The switches can be semiconductor switches and so on. Basically, as one can ascertain from FIG. 1, the multiple pressure sensors as 10, 20 and 30 are each optimized for a specific portion of the pressure range that they operate in. The multiple sensing elements are selected via selectors 11, 21 and 31 which may be switches as controlled by the range selector 25. Thus the system produces an output over the entire pressure range as from 0 to N psi via output amplifier 16. This produces a reliable and consistent output for a user, whereby each of the separate pressure transducer operates efficiently within a given range and, therefore, selection of one of the transducers for the range produces a continuous high-accurate output. It is understood that in regard to pressure transducers, one normally employs a diaphragm which can be fabricated from silicon or some other semiconductor or other material. The natural frequency of a diaphragm is important as it is the frequency which the diaphragm is most sensitive or resonates at. It is known that the greater the thickness of the diaphragm the higher the natural frequency while the greater the area the lower the natural frequency. The natural frequency is inversely proportional to the square of the radius of a diaphragm. Since silicon has a very high stiffness to density ratio, with a modulus essentially equal to that of steel and a density comparable to aluminum, together with the fact that high piezoresistive coefficients of silicon piezoresistors and small size have resulted in transducers with high natural resonant frequencies. In any event, it is known that for accurate low frequency measurements a pressure transducer should employ a relatively large diaphragm which can be of a given thickness. Therefore, pressure transducer 10 would be differently manufactured than pressure transducer 20 or pressure transducer 30. As will be explained further, a pressure transducer normally is a Wheatstone bridge configuration where each of the bridge resistors are piezoresistive devices. A semiconductor bridge is secured to a silicon or other diaphragm to fabricate a pressure or force transducer such as transducers 10, 20 and 30. Also as indicated above because of the operating range the transducers are different, as for example each transducer 10, 20 and 30 may have a different active area or may be separate transducers having different diaphragm thicknesses as well as different active areas. As seen from FIG. 1, the range selector and control 25 receives pressure P and contains a pressure sensor which operates over an entire range. Depending on the voltage output of the range selector pressure transducer in module 25, the range selector by determining the voltage output, selects one of the transducers 10, 20 or 30 according to the desired range and the selection is done by selectors 11, 21 and 31 which, as indicated above, can be switches. These switches can be semiconductor switches or mechanical switches or any other type of switch. Thus, as seen in FIG. 1, a major aspect of the present invention is to provide multiple sensing elements, or multiple transducers, each of which is optimized for a specific portion of the pressure range to be employed.

Figure 2:
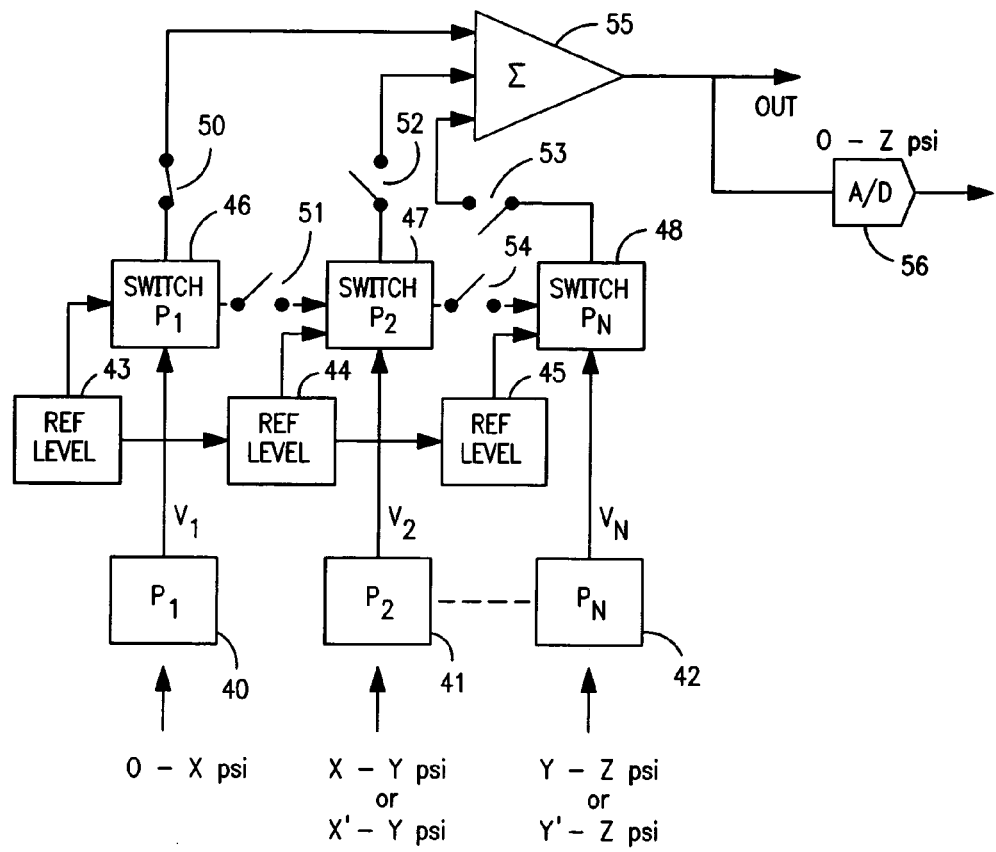
FIG. 2 is a block diagram of an alternate embodiment of such a transducer.

Referring to FIG. 2, there is shown an alternate embodiment of a switched multiple range transducer. As seen in FIG. 2, there is no range selector and control module as 25. There are again, three pressure transducers as shown by example as transducer 40, 41 and 42. Each transducer, as before, is designed to operate over a selected range. For example, pressure transducer 40 operates over the range of 0 to X psi while pressure transducer 41 operates over the range of X to Y psi, and transducer 42 operates over the range of Y to Z psi. In any event, it is also shown that pressure transducer, as for example 41 may operate over the range of $X^1$ to Y. $X^1$ could be slightly greater than X, or slightly smaller than X, to enable one to build in a pressure delay in regard to operating these switches. The system of FIG. 2 operates as follow. Each pressure transducer as 40, 41 and 42 is associated with a switch module, as pressure transducer 40 is associated with switch 46, pressure transducer 41 is associated with switch 47 and pressure transducer 42 is associated with switch 48. Each of the switches is associated with a separate reference level, as reference level 43 for switch 46, reference level 44 for switch 47 and reference level 45 for switch 48. First assume that the pressure is in the range of 0 to X psi. In this range the switch 50 is closed and the output of pressure transducer 40 is applied to an input of a summing amplifier 55. Switch 46 will operate when the voltage from $P_1$ exceeds a predetermined reference level value. When switch $P_1$ operates contact 50 opens and contact 51 and contact 52 closes. These contacts are operated by the switch and are shown in schematic form. In any event, switch 47 operates contact 52 so the output of pressure transducer 41, indicative of the range X to Y psi is now provided to an input of the summing amplifier 55. If the pressure rises then switch 47 operates. When switch 47 ($P_2$) operates as controlled by reference level generator 44, contact 52 again opens, while contact 54 and 53 are closed. This now enables the output of pressure transducer 42 to be applied via switch 48 to an input of the output amplifier 55. It is also seen that reference level generator 43 is coupled to reference level generator 44 while reference level generator 44 is coupled to reference level generator 45. In this manner the reference voltages are added together to produce a difference reference level for each of the reference level generators. Because the voltages are coupled via a resistor network, this enables better temperature tracking and so on. Thus as one can easily see from FIG. 2, if the pressure starts out at a high value then switch 46 operates to open contact 50 and to close contact 51 and 52 if the reference level from generator 44 is within a predetermined value, if not then switch 48 will operate contact 53 and so on. Thus it is seen that during any range depending on the voltage output from the pressure transducers and the reference level generated one of the switches as 46, 47 or 48 will operate, enabling one of the pressure transducers to be coupled to output amplifier 55. Each transducer, as indicated, is indicative of a particular pressure range. It is also seen that the output of amplifier 55 can be coupled to an analog digital converter 56 to produce a digital signal at the output, or can produce a signal indicative of a pressure range of 0 to Z psi at the output of the amplifier 55.

Figure 3:
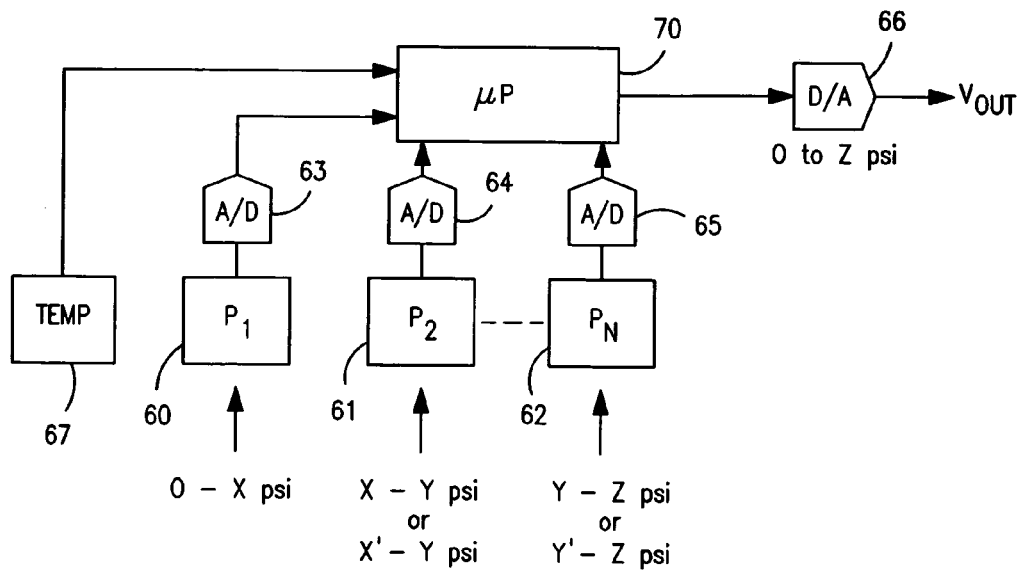
FIG. 3 is a block diagram of another embodiment of such a transducer.

Referring to FIG. 3, there is shown still an alternate embodiment of the present invention. FIG. 3 shows three pressure transducers as 61, 61 and 62 each associated and designed to accommodate a given pressure range as indicated above. Each pressure transducer has its output coupled to an analog digital converter as A/D converter 63 for pressure sensor 60, A/D converter 64 for pressure sensor 61, A/D converter 65 for pressure sensor 62. Each pressure sensor as indicated above is associated and accurately designed for a given pressure range. The output from each pressure transducer is converted to a digital signal by the associated A/D converter. These digital signals are applied to a microprocessor 70 at the real time inputs. The microprocessor 70 scans each digital input and determines what the pressure range is. This is easily done, as for example, if the pressure range is 10 psi the microprocessor understands that the input from pressure transducer $P_1$ is the most accurate input and, therefore, processes this input to produce an output. If the microprocessor sees that the pressure exceeds, for example, X psi, but does not exceed Y psi, then it immediately processes and connects the output from pressure transducer 61 to the output lead. If the microprocessor 70 determines that the pressure exceeds Y psi, then it couples the output from pressure sensor or transducer 62 to the microprocessor output. The microprocessor program is a simple program and can make an easy determination. The output of microprocessor goes to a digital analog converter 66 to produce an output signal which is an analog signal over the given voltage range of 0 to Z psi, as indicated. It is understood, that while three transducers are shown, one can have more than three. It is also understood that one can have multiple headers, or multiple pressure transducers, in an associated header, where each transducer is optimized for a desired portion of the range or one can utilize a single header with multiple sensors or transducers, each optimized separately. The fabrication of pressure transducers as indicated above is well known and Kulite Semiconductor Products, the assignee herein, has many such transducers which will operate accordingly. FIG. 3 also shows a temperature unit 67, which sends a digital signal indicative of the system operating temperature to the microprocessor 70. Hence the microprocessor 70 can compensate for temperature operation of each transducer as 60, 61 and 62. This scheme is shown in U.S. Pat. No. 4,192,005, entitled "Compensated Pressure Transducers Employing Digital Processing Technology", issued on Mar. 4, 1980 to A. D. Kurtz and assigned to Kulite.

Figure 4:
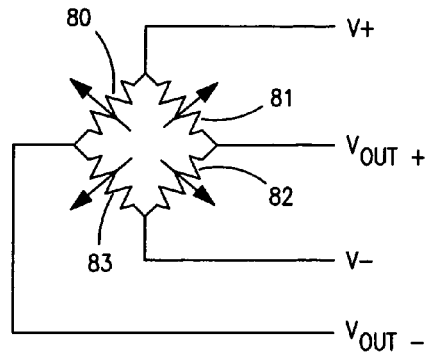
FIG. 4 is a schematic representation of a sensor arranged as a Wheatstone bridge configuration.

Referring to FIG. 4, there is shown a typical pressure sensor configuration. As indicated, a pressure sensor comprises a Wheatstone bridge, normally having 4 piezoresistors as 80, 81, 82 and 83. The bridge is biased by a positive voltage and has its output taken as shown. In this manner, as a pressure is applied the piezoresistors vary in resistance to cause the bridge to produce a voltage output proportional to the applied pressure. The applied pressure flexes the diaphragm and hence causes piezoresistors to change resistance. Thus, the sensor as seen produces a given voltage for a given applied pressure. This voltage of course determines the applied pressure and, therefore, any monitoring circuit coupled to the Wheatstone bridge would know or determine what the pressure range is by determining the voltage output from the bridge.

Figure 5:
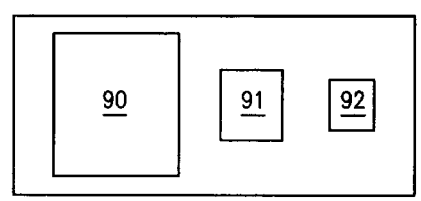
FIG. 5 is a top-plan view of an integrated circuit which can be employed together with this invention.

FIG. 5 depicts a top plan view of the semiconductor chip having located thereon 3 diaphragms designated as 90, 91 and 92. It is shown that each diaphragm, or the active area of each diaphragm, is different. Each of the diaphragms will have the same thickness, but different active areas. Thus FIG. 5 depicts a single chip multiple range pressure transducer devices, each of which has a silicon substrate having a plurality of simultaneously formed thin regions where the thin regions are the diaphragm regions. Each has the same minimum thickness. A plurality of piezoresistor circuits are formed on the silicon substrate within the active area. Each of the thin regions deflects a different amount upon application of a common pressure thereto. Whereby, when excited, each of the circuits provides an output indicative of the common pressure over a different operating range. This configuration is depicted in great detail in U.S. Pat. No. 6,642,594 entitled "Single Chip Multiple Range Pressure Transducer Device" issued on Nov. 4, 2003 to A. D. Kurtz, an inventor herein, and assigned to Kulite Semiconductor Products, Inc., the assignee herein. That patent is incorporated in its entirety within this application. See also U.S. Pat. No. 6,861,276 issued on Mar. 1, 2005 entitled "Methods of Fabricating a Single Chip Multiple Range Pressure Transducer Device" by A. D. Kurtz and assigned to the assignee herein. As indicated from the above noted patents the semiconductor wafer such as that depicted in FIG. 5 has three sensors each located within an active area as 90, 91 and 92 where each active area is of a different dimension, where each diaphragm has the same thickness and, therefore, each of the diaphragms and the sensors associated with the diaphragms will operate in different pressure ranges. FIG. 5 shows three such diaphragm areas while the above noted patent shows two such diaphragm areas. In any event, it is apparent that two or more diaphragm areas can be employed obtaining the benefits of transducers which can operate over different pressure ranges.

Figure 6:
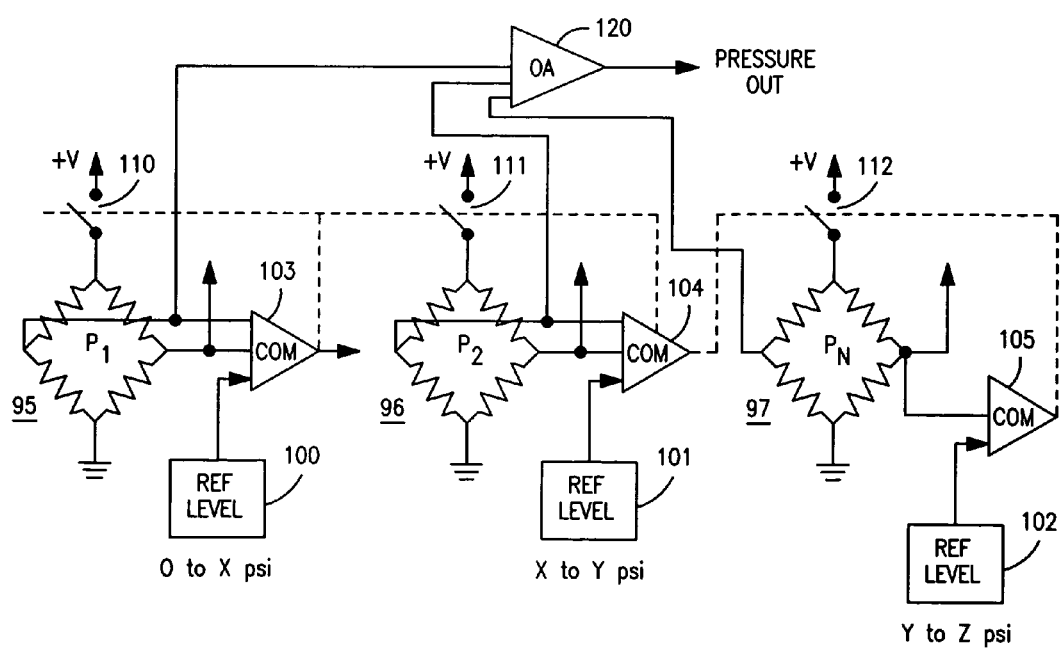
FIG. 6 is a schematic block diagram of another embodiment of a internally switched multiple range transducer according to this invention.

Referring to FIG. 6, there is shown still another embodiment which can be employed. In FIG. 6 there are shown three pressure sensors as 95, 96 and 97. Each pressure sensor is associated with a switch as 110 for pressure sensor 95, 111 for pressure sensor 96 and 112 for pressure sensor 97. As seen each voltage output of the pressure sensors is directed to the input of a comparator. Thus pressure sensor 95 is coupled to comparator 103, comparator 103 is also coupled to a reference level generator 100. In a similar manner the output of pressure sensor 96 is coupled to the input of comparator 104 which compares the output of sensor 96 with reference level generator 101. The output of pressure sensor 97 is coupled to comparator 105 which is associated with a reference level generator 102. Each comparator can operate the respective switch as 110, 111 and 112. As seen in FIG. 6, switch 110 is normally closed, thus applying bias and operating potential to the bridge 95. If the pressure level is within the range of 0 to X psi then comparator 103 keeps switch 110 closed while switches 111 and 112 are open. Thus only the output from bridge 95 is directed to the output amplifier 120. If the pressure rises, then the voltage output from the bridge 95 will increase until it exceeds the reference level 100 at which time comparator 103 will open switch 110 and close switch 111. In this manner, the pressure transducer 96 will determine the output as it is the only transducer which receives a voltage. As the pressure rises then reference level generator 100 will cause comparator 104 to operate. When comparator 104 operates it again opens switch 111 and closes switch 112, which enables the pressure sensor 97, or bridge 97, to be connected to the input of the output amplifier 120. It is understood each of the diaphragms may have a stop which will prevent the diaphragm from further deflecting once a maximum deflection is set. As one can ascertain, the way the circuit operates is that comparator 103 which is coupled to reference level generator 100 is always operated to cause contact 110 to be open because the output of the bridge 95 will always be at a high voltage as the pressure exceeds X psi. The diaphragm associated with bridge 95 will not deflect as it will be stopped at a given pressure and cannot deflect any further. In the same manner, if the pressure exceeds Y psi then comparator 104 continues to operate to keep contact 112 closed and contact 111 open. If the pressure goes down and goes into the range between X to Y psi, then comparator 103 will cause switch 111 to close giving circuit control to bridge 96. Again if the pressure goes down so that it is in the range of 0 to X psi then switch 110 closes, placing sensor 95 in operation and receiving bias. This happens because comparator 103 will be in its quiescent state causing switch 110 to close, placing sensor bridge 95 in operation. The bridge 96 and 97 do not receive operating potential and, therefore, do not affect the output. As the pressure rises beyond X psi then comparator 103 operates to open switch 110 and, therefore, remove bias from bridge 95 and close switch 111 to enable sensor bridge 96 to control the output 120. A pressure transducer and switch combination which would operate in regard to the diagram in FIG. 6 is depicted in U.S. Pat. No. 6,545,610 issued on Apr. 8, 2003 to A. D. Kurtz, et. al. and assigned to Kulite Semiconductor Products, Inc., the assignee herein. That patent entitled "Pressure Transducer and Switch Combination" shows a piezoresistive bridge coupled to a comparator to produce an output when a pressure exceeds a predetermined threshold. That circuit can be used for the comparators shown in FIG. 6. In any manner it should be clear from the above-noted discussion that one can provide a multiple range transducer by utilizing multiple sensing elements as multiple transducers and an appropriate switching circuit which can be an analog or digital circuit to condition the signal. Thus each of the multiple sensors or transducers can be designed to accurately accommodate a given pressure range and can be employed to produce an output when the applied pressure is within that range. In this manner, the most accurate and efficient sensor is used for each of the plurality of pressure ranges to be measured, therefore, providing a high degree of accuracy across a relatively large pressure range. It should be apparent to one skilled in the art that there are many alternate ways of accomplishing the above-noted invention, all of which are deemed to be encompassed within the spirit and claims appended hereto.

What is claimed is:

1. A multiple range pressure transducer, comprising: a plurality of pressure sensors, each responsive to an associated pressure range, wherein each sensor can accommodate a different pressure range to enable accurate pressure measurements over a wide range equal to the sum of said different ranges, means coupled to said plurality of pressure sensors and operative to select any one of said sensors according to the magnitude of an applied pressure, said selected sensor determined by which said applied pressure is within the desired operating range of said sensor.

2. The transducer, according to claim 1, wherein each sensor is a semiconductor pressure sensor employing a deflectable diaphragm with a piezoresistive array located on said diaphragm.

3. The transducer, according to claim 2, wherein at least some of said sensors are fabricated on the same semiconductor substrate with the same diaphragm thickness but having different diaphragm areas.

4. The transducer, according to claim 2, wherein said piezoresistive array is a Wheatstone bridge array.

5. The transducer, according to claim 1, wherein said means coupled to said sensors, includes a plurality of switches, each one associated with a predetermined sensor and when operated, selects said sensor according to the magnitude of said applied pressure.

6. The transducer, according to claim 5, including: a range selector operative to monitor said applied pressure for determining the range of said applied pressure, and a sensor selector for operating said associated switch to select said sensor.

7. The transducer, according to claim 1, wherein said means coupled to said plurality of sensors includes a microprocessor having inputs for recovering digital signals indicative of an associated sensor output and for processing said signals to provide an output signal from one sensor selected according to a pressure range.

8. The transducer, according to claim 1, wherein said means coupled to said plurality of sensors includes a comparator associated with each sensor and operative to receive said sensor output,
a reference level generator associated with each comparator for generating a reference level at which said comparator is operated according to said sensor output to select another sensor for operation according to a pressure range.

9. The transducer, according to claim 7, further including an analog to digital converter associated with each sensor for receiving said analog sensor output and for converting said analog output to a digital signal for application to said microprocessor.

10. The transducer, according to claim 1, further including output means coupled to said means to provide an output signal over said wide pressure range.

11. A method of measuring pressure with a high degree of accuracy over a relatively large pressure range, comprising the steps of:
providing a plurality of pressure sensors each capable of accurately measuring pressure within a predetermined different pressure range included in said wide range,
determining the magnitude of a pressure applied to said pressure sensors, and
selecting one of said pressure sensors operating within said pressure range determined by said applied pressure.

12. The method, according to claim 11, wherein the step of selecting includes the steps of:
providing an output circuit and switching said selected sensor to said output circuit for providing an output signal from said sensor when selected.

13. The method, according to claim 11, wherein the step of selecting includes the step of:
applying an operating potential to only said selected sensor.

14. The method, according to claim 11, including the step of:
fabricating said sensors on a common substrate, where each sensor has the same diaphragm thickness with a different size active area.

15. The method, according to claim 14, including the step of:
forming a piezoresistive array on each active diaphragm area.

16. The method, according to claim 15, wherein the step of forming includes forming a Wheatstone bridge array.

* * * * *